United States Patent [19]

Rose et al.

[11] Patent Number: 4,627,735
[45] Date of Patent: Dec. 9, 1986

[54] DOUBLE REVERSE HELIX AGITATOR

[75] Inventors: Philip M. Rose, Naperville; Yoon S. Song, Lisle, both of Ill.

[73] Assignee: Standard Oil Company (Indiana), Chicago, Ill.

[21] Appl. No.: 699,335

[22] Filed: Feb. 7, 1985

[51] Int. Cl.⁴ ............................................. B01F 7/00
[52] U.S. Cl. ................................ 366/329; 366/81; 366/320; 366/321; 366/327; 422/135; 526/65
[58] Field of Search ............... 366/144, 149, 292, 293, 366/295, 319, 320, 310, 325, 326, 327-330, 339; 422/135; 526/65

[56] References Cited

U.S. PATENT DOCUMENTS

| | | | |
|---|---|---|---|
| 992,629 | 5/1911 | Akins | 366/320 X |
| 1,500,061 | 7/1924 | Dimm | 366/329 X |
| 2,203,672 | 6/1940 | Chester | 366/329 X |
| 3,251,579 | 5/1966 | Lasar | 366/327 X |
| 3,638,920 | 2/1972 | Davis | 366/327 X |
| 4,187,030 | 2/1980 | Godley | 366/321 |
| 4,460,278 | 7/1984 | Matsubara et al. | 366/293 X |

Primary Examiner—Timothy F. Simone

[57] ABSTRACT

The double reverse helix agitator with an internal conveying screw is used in a gas phase olefin polymerization reactor having at least one polymerization section and has helical flights defined by helical blades which are mounted to a shaft, which extend in opposite axial directions and which have approximately the same radius from the axis of rotation of the agitator. The shaft has a spiral screw thread thereon for conveying polymer particles axially by the agitator through a reactor vessel.

17 Claims, 6 Drawing Figures

DOUBLE REVERSE HELIX AGITATOR

BACKGROUND OF THE INVENTION

1. Field of the Invention

The present invention relates to a double reverse helix agitator for use in a gas phase olefin polymerization reactor.

2. Description of the Prior Art

Heretofore it has been proposed to use a paddle wheel type agitator in a gas phase olefin polymerization reactor in the Jezl et al. U.S. Pat. Nos. 4,101,289 and 4,129,701.

Also, it has been proposed in the Sennari et al. U.S. Pat. No. 3,944,534 to provide in gaseous-phase polymerization of olefins including a vertically disposed cylindrical tank having a reaction chamber therein and a ribbon agitator situated in the chamber and having ribbon vanes which extend or incline upwardly from an anchor shaped agitator blade at the bottom of the tank.

Further, it has been proposed in U.S. Pat. No. 3,522,227 directed to polymerization of vinylchloride to provide an outer helical stirrer having one pitch and an inner, smaller diameter, helical stirrer oppositely pitched to the blade of the outer stirrer, in a second stage fixed autoclave.

Still further a double helical agitator with non-reversing, aidingly pitched, same radius, helical blades is disclosed in the Matsuhara et al. U.S. Pat. No. 4,460,278.

As will be described in greater detail hereinafter, the double reverse helix agitator of the present invention differs from the previously proposed stirrers by comprising oppositely pitched flights having approximately the same radius from the axis of rotation of the agitator and by comprising a center shaft with a spiral thread thereon for moving polymer particles to a polymer takeoff vessel as the agitator is rotated.

SUMMARY OF THE INVENTION

According to the invention there is provided for use in a gas phase olefin polymerization reactor having at least one polymerization section, a double reverse helix agitator comprising a shaft, first and second helix flights having the same pitch, but extending in opposite axial directions, having approximately the same radius from the axis of rotation of said agitator shaft and being mounted to said shaft, and a spiral screw thread on said shaft for moving particles axially of said agitator.

DESCRIPTION OF THE PREFERRED EMBODIMENT

Figure 1:
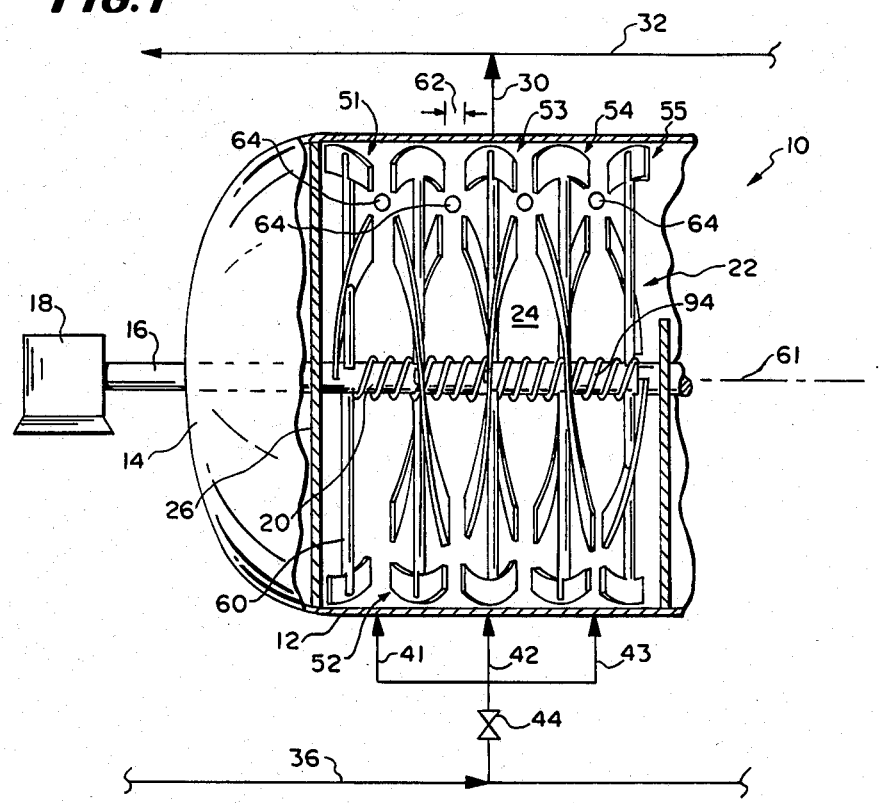
FIG. 1 is a side elevational view of one end of a reactor vessel having four individually controllable polymerization sections therein separated from one another by weirs and with portions broken away to show the first section and a double reverse flight helix agitator therein constructed according to the teachings of the present invention.

Referring now to the drawings in greater detail, there is illustrated in FIG. 1 a gas-phase olefin polymerization reactor 10 comprising a generally cylindrical vessel 12 having an end bell 14 with an opening (not shown) therein through which a shaft 16 extends for connection to a prime mover or gear box 18. The shaft 16 is suitably splined to a cylindrical shaft 20 of a double reverse flight helix agitator 22 constructed according to the teachings of the present invention which is situated in a first polymerization section 24 within the vessel 12 between an end wall 26 adjacent the end bell 14 and a first weir 28.

Although not shown, it is to be understood that the vessel 12 can have four, individually controllable polymerization sections, the first section 24 of which is shown in FIG. 1. Alternatively, the reactor vessel 12 can be constructed without weir as will be described in greater detail hereinafter.

Each of the sections is separated by a weir, such as the weir 28. The successive weirs have smaller radial extents from the inside circumference of the vessel to the height of the weir so that material will overflow from one section to another section. Preferably, each weir is constructed with a height such that the polymer beds therein fill about half the volume of the reactor 10. Then, as the solid polymer exceeds the weir height, it falls into an adjacent section moving in the direction of a takeoff from the reactor 10 (at the other, right side or end of the vessel 12).

A first vapor takeoff 30 from the section 24 is shown in FIG. 1 and is connected to a main vapor takeoff line 32 connected in parallel to other takeoffs from the other polymerization sections.

As known in the art, polymer solid builds up in the stirred reactor 10 and traverses the length of the reactor 10 essentially because of polymer buildup in the polymer bed and not by the agitator 22. This condition is ensured by the design of the agitator 22 which provides for agitation but not for backward or forward movement of the bed. Polymer particles in the bed adjacent to a takeoff barrier are swept, by the stirring, through a takeoff barrier opening. Such opening may be made variable in size and position by a number of devices for maintaining different levels of polymer solid in the reactor, such as by the weirs. The weirs, such as the weir 28, may be attached to the drive shaft 20 with slip rings or fixed to the walls of the reactor 10 and are beneficially oriented so that the top of each weir is roughly aligned with bed orientation during agitation. This provides for spillover along the entire length of the top of the weirs.

Reactors of this type, using paddle wheel type agitators, are disclosed in the Jezl et al. U.S. Pat. No. 4,101,289 and the Jezl et al. U.S. Pat. No. 4,129,701.

As disclosed in the prior patents identified above, polymer solid is produced in each of the stirringly agitated sections (e.g., section 24) and due to the continued production of such polymer, the amount of polymer product constantly passes through a takeoff barrier (not shown) and out of the reactor 10 into a polymer takeoff vessel (not shown) at the end of the vessel 12. A vapor recycle line 36 can supply the polymerizable monomer, or hydrogen, if used, to inlets 41, 42, and 43 in the first polymerization section 24 and to similar inlets in subsequent sections. The rate at which the vapor recycled gases are introduced into the individual sections is controlled by a valve, such as the valve 44 for the first section 24.

The reactor 10 may be utilized for the polymerization of polymerizable monomers which are polymerizable below the softening point of the polymeric forms and can include ethene, propene, 4-methyl pentene-1, butene-1, vinylchloride, butadine, styrene, and mixtures of such monomers. Particularly suitable are the polymerizations of ethene, propene or propylene, butene or mixtures thereof.

Figure 2:
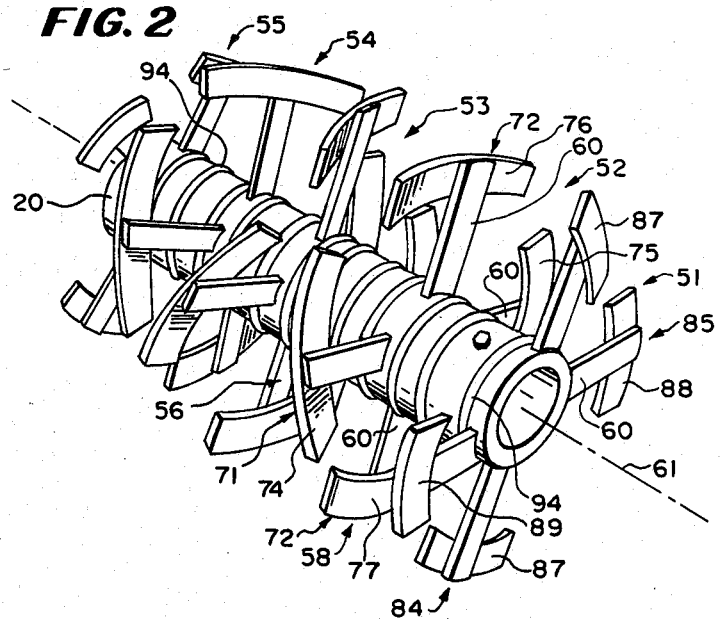
FIG. 2 is a perspective view of the double helix agitator shown in FIG. 1.
Figure 3:
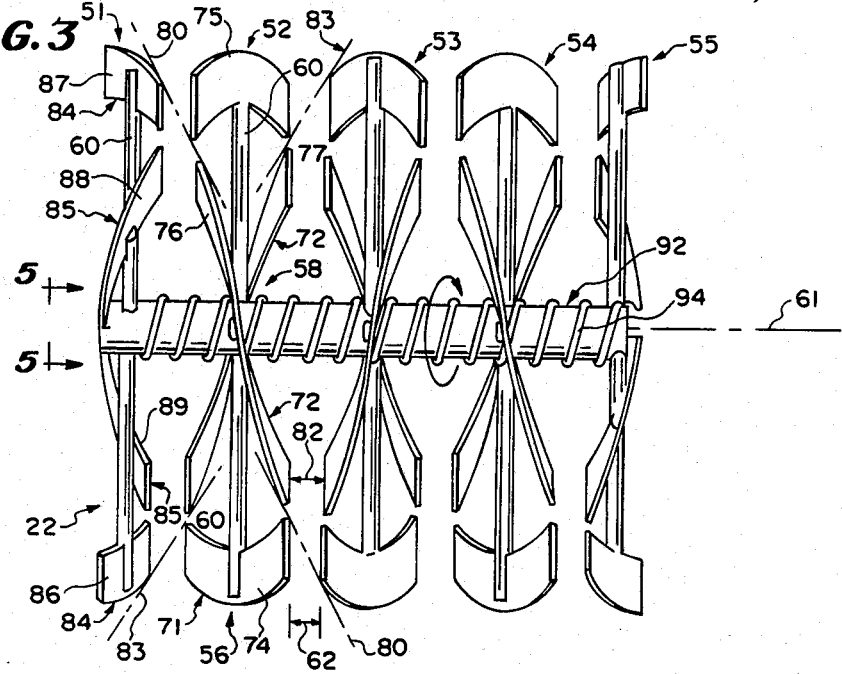
FIG. 3 is an enlarged side elevational view of the helix agitator shown in FIG. 1.

As shown in FIGS. 2 and 3, the double reverse flight helix agitator 22 received in the section 24 comprises five sections 51, 52, 53, 54 and 55. Since the sections 52–54 are essentially identical, only one section, section 52, is described in detail herein. Each of the other polymerization sections (not shown) will have similar agitators 22 therein.

The section 52 comprises two pairs 56, 58 of struts or spokes 60 (FIG. 2) resulting in four struts 60 per section 51, 52, 53, 54 or 55. The sections 51–55 are positioned for rotation about an axis 61 of the agitator 22. Of course, for an agitator 22 used in larger reactor vessels 12, more struts for blades may be required. The dimensions described herein are for both large commercial reactors 10 and for pilot (small scale) reactors 10.

Typically, each double reverse helix section 52–54 is separated by a space 62 (FIG. 3) which can be between 0.5 and two inches and is approximately 1 inch in a pilot reactor 10. This space 62 enables sensors 64 to extend from the wall of the cylindrical vessel 12 of the reactor 10 into the vessel 12 between double reverse helix sections 52–54 for sensing various parameters, such as temperature. In one embodiment of the reactor 10, with the space 62 between sections at approximately 1 inch, the center-to-center distance between spaces 62 on each side of a helix section, e.g. section 52, is between 1 and 6 inches and approximately 4 inches for the pilot reactor 10. Again, in larger agitators 22, a spacing 62 of more than 1 inch may be used.

The diameter of the double reverse flight helix 22 is approximately 16 inches in the pilot unit and this is approximately 0.99 to 0.995 of the diameter of the vessel 12.

Each section 52–54 comprises two pairs 71, 72 of blades 74, 75 and 76, 77 with each pair 71 or 72 being 180° from the other pair 72 or 71 and having a pitch opposite to the pitch of the other pair 72 or 71. That is to say, each pair of blades 71 and 72 includes two struts 60, 180° from each other.

Also, the blades 74–77 have approximately the same radius from the center or axis of the shaft 20. In the pilot reactor 10 the radius from the axis of the shaft 20 and the outer edge of each blade 74–77 is approximately 8 inches.

Figure 6:
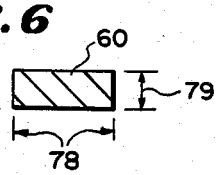
FIG. 6 is a sectional view taken along line 6—6 of FIG. 4 and shows a cross section of one of the spokes on which a helix blade is mounted.

Each of the struts 60 is made of metal and in the pilot reactor has a rectangular cross-section (FIG. 6) with a long dimension 78 of approximately 1.5 inches and a short dimension 79 of approximately 0.5 inch and extends radially outwardly from the cylindrical shaft 20 which has an inner diameter of approximately 2.375 inches and which is approximately 1 inch thick so as to have an outer diameter of approximately 3.375 inches.

Each of the struts 60 extends approximately 6 inches from the outer surface of the cylindrical shaft 20 to one of the blades 74, 75, 76 or 77 in the pilot reactor 10.

Each blade 74–77 has a spiral pitch with a slope 80 (FIG. 3) extending in one or the other axial direction and extends for an arcuate distance of approximately 67.5° about a circle 81 (FIG. 4) passing through each blade 74–77.

The thickness of each blade 74–77 in the pilot reactor is approximately 0.25 inch and has a radial extent from its inner diameter to its outer diameter of approximately 1.5 inches in one preferred embodiment. The thickness of each helix blade 74–77, in terms of a ratio of the thickness to the inner diameter of the reactor vessel 12, is between approximately 0.08 and approximately 0.15.

Each of the blades 74–77 has a spiral pitch which ranges between 0.5:1 to 2:1 and is preferably 1:1. By a pitch of 2:1 is meant that you would have twice as many helices in the same axial length as you would have in a section that would have a 1:1 pitch.

In another preferred embodiment, the outer axially facing edges of one pair 56 or 58 of blades 74–77 has a 1 inch spacing 62 from the outer axially facing edges of an adjacent pair 56 or 58 of blades 74–77 and the outer axially facing edges of one pair 58 or 56 of blades 74–77 has a spacing 82 of 1.5 inches from the outer axially facing edges of an adjacent pair 58 or 56 of blades.

It will be understood that the spiral flight, which is coextensive with the slope 80, of one pair 56 of blades 74, 75 in section 52 will continue across the spacing 62 or 82 between sections 52 and 53 (53 and 54) with the stuts 60 of the blades 74, 75 offset 180° from the struts 60 of the blades 74 and 75 in section 52. Likewise, the pair 58 of blades 76 and 77 having a reverse flight or slope 83 have a similar but reverse orientation in the sections 52–54.

Figure 4:
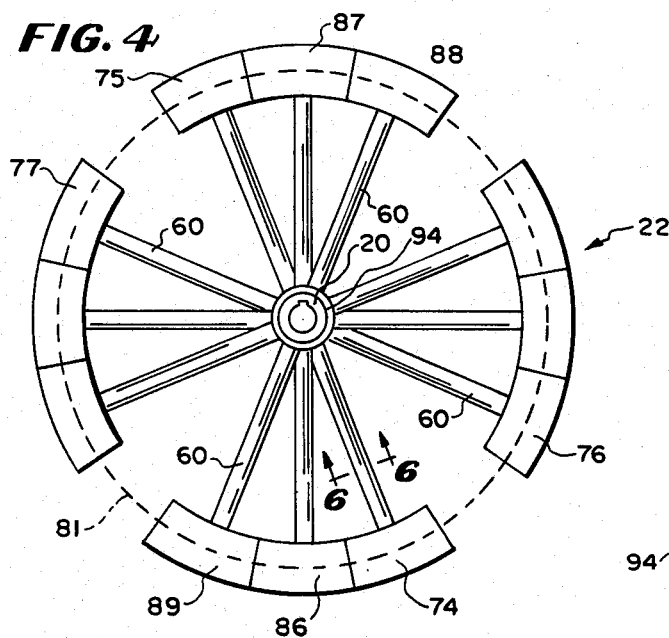
FIG. 4 is an end view of the helix agitator shown in FIG. 3.
Figure 5:
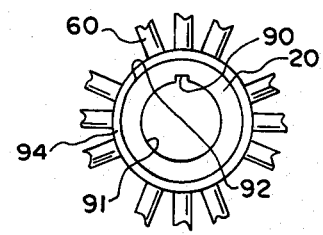
FIG. 5 is an enlarged end view of the shaft of the agitator shown in FIG. 3 and is taken along line 5—5 of FIG. 3.

The end sections 51 and 55 each have a pair 84, 85 of blades 86–89 which are mounted on four struts 60, respectively. The pair 84, 85 are disposed approximately 45° from each other and each blade 86–89 has a spiral pitch with a slope 80, 83 extending in one or the other axial direction and extends for an arcuate distance of approximately 22⅓° about the circle 81 (FIG. 4).

The spacing from the axial outer edges of the blades 86–89 in the end sections 51 and 55 to the center of the inner space 82 is approximately 2 inches in one preferred pilot reactor 10.

The cylindrical shaft 20 which is mounted on the shaft 16 by means of a key or spline (not shown) that is received in a key or spline opening 90 which extends axially into the cylindrical shaft 20 and radially outwardly from an inner cylindrical surface 91 of the cylindrical shaft 20.

As shown, an outer cylindrical surface 92 of the cylindrical shaft 20 has, a screw thread 94 thereon. In one preferred embodiment this screw thread 84 extends approximately 0.25 inch from the outer cylindrical surface 92 of the cylindrical shaft 20. The screw thread 94 has a pitch of from approximately 0.25:1 to 1:1 and a height above the outer surface of the shaft 16 of 0.1 to 0,5 times the outer diameter of shaft 16 and serves to move polymer particles from polymerization section to polymerization section until they finally fall off into the polymer takeoff vessel (not shown).

With the screw thread 94 it has been found that the weirs can be omitted and the screw thread 94 performs an adequate job of moving the polymer product to the polymer takeoff vessel. Also in that embodiment the helix agitator can extend the full length of the vessel 12 or at least one third (⅓) the length thereof at the feed end shown in FIG. 1. Preferably, the reactor 10 is constructed without weirs and polymer particles are moved through the vessel 12 by the screw thread 94.

It will be apparent that one pair 56 of blades 74, 75 have a helix pitch or slope 80 which tends to move the polymer bed material toward one end of the reactor 10 whereas the other pair 58 of blades 76, 77 have a helix pitch or slope 83 which tends to move the polymer bed material in the other direction. As a result, when rotating, the blades 74, 75, 76 and 77 tend to move the polymer bed material in opposite directions and as a result such axial forces on the polymer bed cancel each other out with respect to axial movement.

In comparisons made between polymer products produced using the previous paddle wheel type agitator and using the double reverse helix agitator 22, it was found that less hexane extractibles (materials that can be extracted from the polymer product by an hexane solvent) were present in polymer products made using the double reverse helix agitator 22 of the present invention indicating better mixing of a catalyst (e.g. TiCl$_3$) with a liquid co-catalyst (e.g. primarily an aluminum alkyl). However, it was also found that when one embodiment of the double reverse helix agitator 22 of the present invention was rotated at a typical speed for a paddle wheel type agitator of 20–30 rpm, the temperature of the reactor 10 fluctuated. Such temperature fluctuations can be eliminated by increasing the speed of rotation of the double reverse helix agitator 22. Accordingly, in order to maintain a constant temperature while achieving less extractibles, when using the double reverse helix agitator 22 of the present invention, one must rotate the agitator 22 at a higher rotational speed than with the corresponding paddle-wheel type agitator.

Nonetheless, even with higher energy requirements for operating the double reverse helix agitator 22 at a higher speed, the advantages of less extractibles content of the polymer powder, e.g., a drop from approximately 3–4 percent by weight to approximately 1.5–2 percent by weight, provided a significant economic savings in utilizing the double reverse helix agitator 22 over the prior paddle wheel type agitator. Also better temperature control is obtained with the helix agitator 22 than is obtained with a paddle wheel type agitator.

It is to be understood that the pitch and height of the screw thread 94 as well as the speed of rotation of the shaft 16 can be varied to provide various conveying rates of polymer product through the reactor 10 depending on the production desired.

From the foregoing description, it will be apparent that the double reverse helix agitator 22 of the present invention provides advantages over the prior paddle wheel type agitator.

Also, it will be apparent from the foregoing description that modifications can be made to the double reverse helix agitator 22 of the present invention without departing from the teachings of the present invention. Accordingly, the scope of the present invention is only to be limited as necessitated by the accompanying claims.

We claim:

1. For use in a gas phase olefin polymerization reactor having at least one polymerization section, a double reverse helix agitator comprising:
    a shaft having a spiral screw thread,
    a first helix flight and a second helix flight each having approximately a same radius from an axis of rotation of said shaft and mounted to said shaft,
    said first helix flight and said second helix flight each having a same pitch of between 0.5:1 and 2:1 with said pitch of said first helix flight extending in an axial direction opposite to said pitch of said second helix flight.

2. The agitator of claim 1 wherein each of said flights has a pitch of 1:1.

3. The agitator of claim 1 wherein said flights are broken so as to form at least three helix sections with a given space between each section.

4. The agitator of claim 3 wherein said spaces are between 0.5 and 2 inches.

5. The agitator of claim 3 wherein said center helix section has a greater axial extent than said helix end sections.

6. The agitator of claim 3 wherein the center-to-center axial spacing between spaces on either side of said center helix section is between 1 and 6 inches.

7. The agitator of claim 1 wherein said flights are broken into five sections with four given spaces therebetween.

8. The agitator of claim 7 wherein each helix section includes two pair of diametrically extending spokes fixed to and extending outwardly from said shaft and four helix blades, one at the outer end of each spoke, with two blades having a given pitch extending in one axial direction and the two other blades having the same pitch but extending in the other axial direction.

9. The agitator of claim 8 wherein said pairs of spokes in each of said three central helix sections are approximately 180° from each other.

10. The agitator of claim 9 wherein each of said blades in each of said three central helix sections extends an arcuate length of approximately 67.5°, 33.75° on each side of said blade's connection to an outer end of one of said spokes.

11. The agitator of claim 8 wherein said pairs of spokes in said end helix section are approximately 45° from each other.

12. The agitator of claim 11 wherein each of said blades in each of said end helix sections has an arcuate length of approximately 22.5°, 11.25° on each side of said blade's connection to an outer end of one of said spokes.

13. The agitator of claim 1 wherein said spiral screw thread has a pitch between 0.25:1 and 1:1.

14. The agitator of claim 1 wherein said shaft has an outer diameter and said thread has a radial height of between approximately 0.1 and 0.5 times the outer diameter of said shaft above the outer surface of said shaft.

15. The agitator of claim 8 wherein said helix blades define a cylindrical envelope having a diameter of between approximately 4 inches and 10 feet.

16. The agitator of claim 10 wherein said helix blades define a cylindrical envelope having a diameter which is 0.99 to 0.995 times the inner diameter of a cylindrical vessel in which said agitator is received.

17. The agitator of claim 1 including a plurality of spokes on and extending radially outwardly from said shaft and a helix blade on the outer end of each spoke, said blades forming said first and second flights.

* * * * *

UNITED STATES PATENT OFFICE
CERTIFICATE OF CORRECTION

Patent No. 4,627,735                    Dated December 9, 1986

Inventor(s) Philip M. Rose and Yoon S. Song

It is certified that error appears in the above-identified patent and that said Letters Patent are hereby corrected as shown below:

| Patent Column | Line | |
|---|---|---|
| 3 | 56 | reads "8" (boldface) and should read --8-- (not boldface) |
| 3 | 66 | reads "6" (boldface) and should read --6-- (not boldface) |
| 4 | 58 | reads "0,5 times" and should read --0.5 times-- |

Signed and Sealed this

Twenty-eighth Day of April, 1987

*Attest:*

DONALD J. QUIGG

*Attesting Officer*            *Commissioner of Patents and Trademarks*